Figure 4:
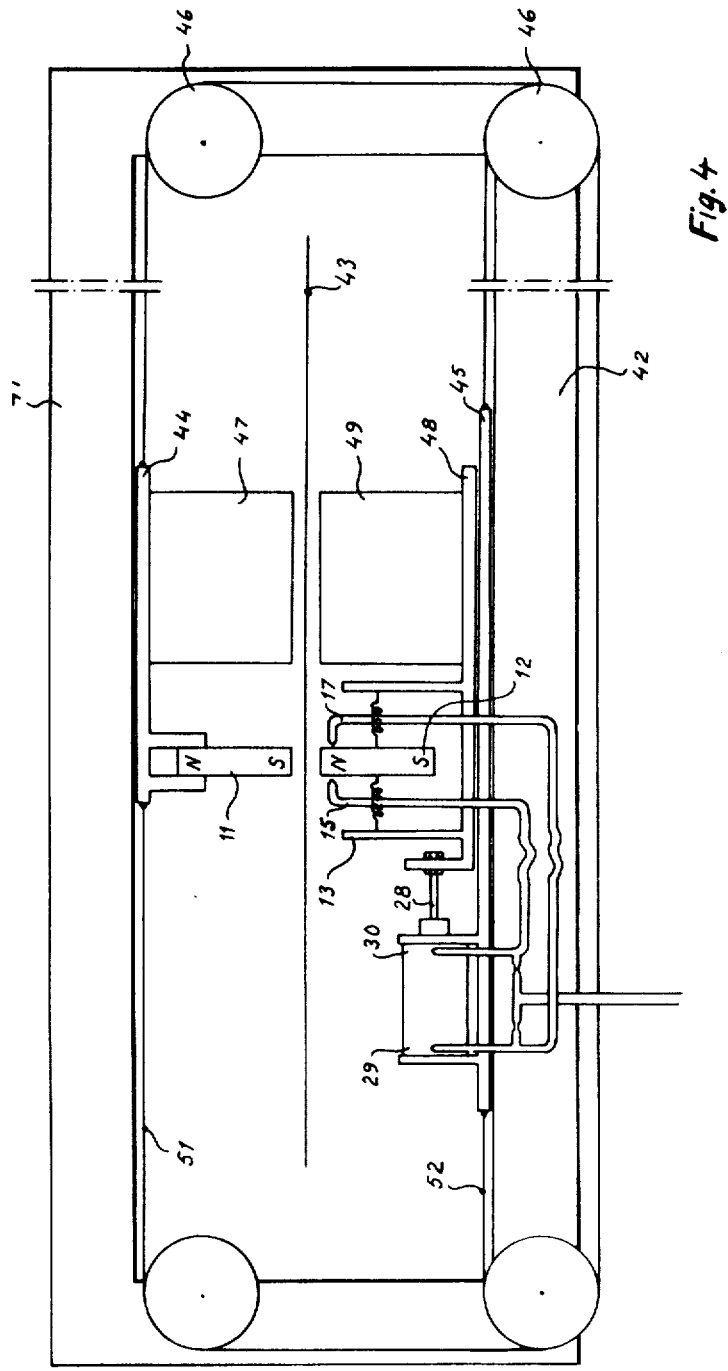

United States Patent [19]

Hanaas

[11] 3,710,686
[45] Jan. 16, 1973

[54] DEVICE FOR AN ACCURATE ADJUSTMENT OF TWO APPARATUS PARTS DISPLACEABLE RELATIVELY TO EACH OTHER

[75] Inventor: Torgeir Hanaas, Upplands Vasby, Sweden

[73] Assignee: Institutet for Mikrovagsteknik, Stockholm, Sweden

[22] Filed: April 19, 1971

[21] Appl. No.: 135,151

[30] Foreign Application Priority Data

April 29, 1970 Sweden ........................... 5996/70

[52] U.S. Cl. .................... 91/3, 137/82, 318/676, 324/34 D
[51] Int. Cl. ............................................. F15b 13/02
[58] Field of Search..324/34 R, 34 PS, 340; 340/282; 336/45; 91/3; 318/645, 653, 676; 137/82, 625.64; 308/10

[56] References Cited

UNITED STATES PATENTS

| 3,015,812 | 1/1962 | Turner | 340/282 |
| 3,110,481 | 11/1963 | Kivenson | 308/10 |
| 3,512,852 | 5/1970 | North | 308/10 |

FOREIGN PATENTS OR APPLICATIONS

| 81,950 | 11/1934 | Sweden | 340/282 |

*Primary Examiner*—Robert J. Corcoran
*Attorney*—Hane, Baxley & Spiencens

[57] ABSTRACT

A device for adjusting the relative position of two displaceable members includes two magnets each positional on a different one of the members in such a way that under normal conditions the axes of the magnets are colinear. One of the magnets is pivotable about a point in its axis so that a relative displacement of the magnets induces the one magnet to pivot and energize a servo mechanism to correctively displace the members until the magnets are again colinear.

4 Claims, 6 Drawing Figures

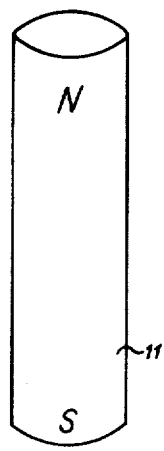
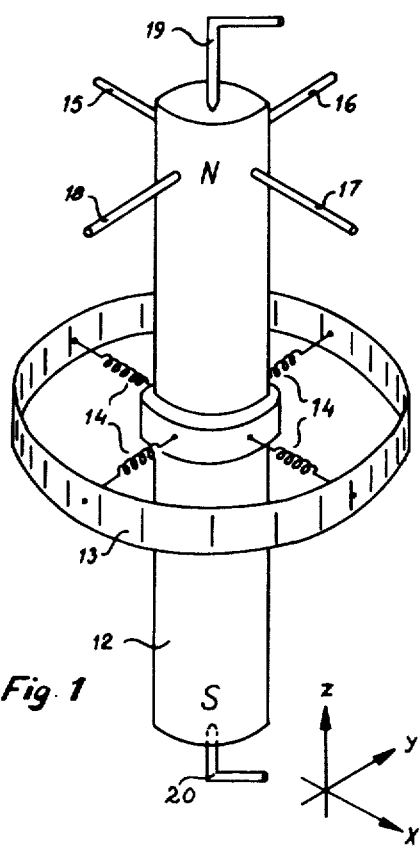
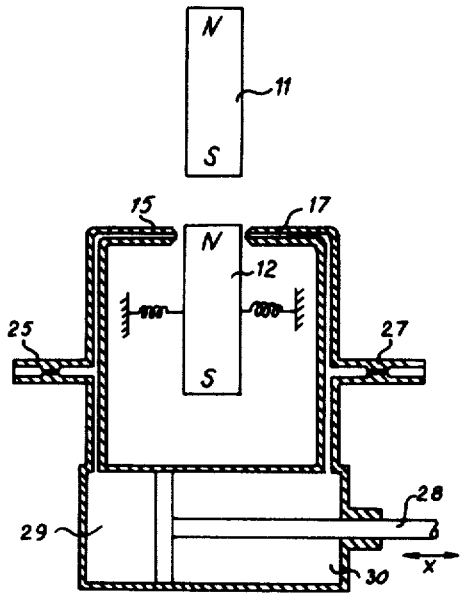
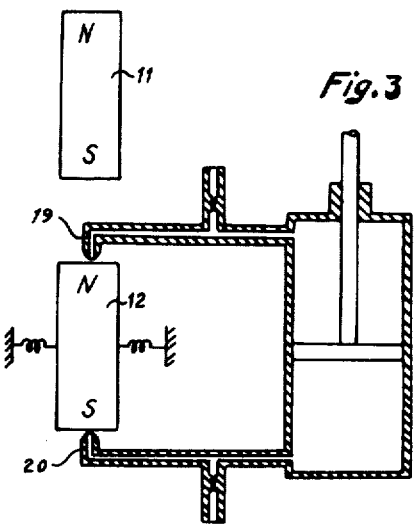
Fig. 1  Fig. 2  Fig. 3
INVENTOR
TORGEIR HANAAS

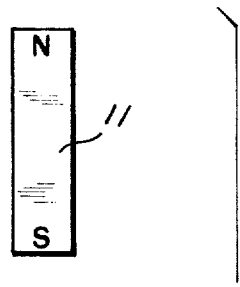
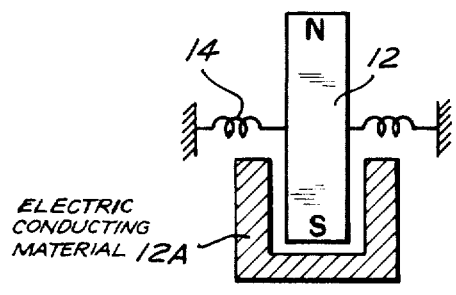
FIG. 5
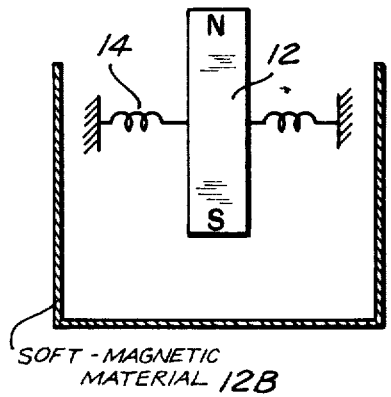
FIG. 6

DEVICE FOR AN ACCURATE ADJUSTMENT OF TWO APPARATUS PARTS DISPLACEABLE RELATIVELY TO EACH OTHER

The present invention relates to a device for an accurate adjustment of two apparatus parts displaceable relatively to each other, and more specifically for displacement of the apparatus parts to a predetermined mutual normal position.

As an example moisture testing of paper can be mentioned, where one utilizes a traversing double-faced hygrometer with two resonator halves mounted on a carriage each running on their beam with the paper web between. It is important for the accuracy of measurement that the two halves during the entire measuring operation keep their positions relative to each other with an accuracy of 0.5 mm in each direction, which is difficult to realize with only mechanical means. Such difficulty is eliminated with a device designed according to the invention, which device is intended for a continuous correction of arising mechanical deviations. In the stated example, also, a permanent magnet with the axis perpendicularly to the paper web is mounted on one carriage besides one resonator half whilst, on the other carriage, the other resonator half is mounted and another magnet suspended by springs. The two magnets endeavor to attract one another and a displacement of any of the magnets results in a movement of the spring suspended magnet, which movement is indicated by compressed air nozzles placed around the moving magnet and causes via cylinders a resetting so that the displacement is counteracted. The characterizing features for a device according to the invention are apparent from the appended claims.

The invention is more fully described in connection with the accompanying drawings, where FIG. 1 schematically shows the two magnets of the device, FIG. 2 shows a part of the servo mechanism for resetting in x-direction, FIG. 3 shows a part of a servo mechanism for resetting in z-direction, FIG. 4 shows the fundamental construction of the servo system and the traversing device, FIG. 5 shows one variation of the device with one magnet partially surrounded within electrical conducting material, and FIG. 6 shows another variation of the device with one magnet shielded by a soft magnetic material.

The device according to FIG. 1 has a fixed magnet 11 and a movably suspended magnet 12, which by means of four springs 14 is suspended in the screen 13. In the upper end of the magnet 12 there are four pressure gas nozzles 15, 16, 17, 18 oriented perpendicularly to the north-south-direction of the magnet and with the nozzles 15 and 17 in the x-direction and the nozzles 16 and 18 in the y-direction. Moreover, at the ends of the magnet there are nozzles 19 and 20 oriented in the north-south-direction of the magnet, which in the normal position is the z-direction.

If it occurs that the apparatus part, to which the screen 13 is fixedly connected, should be displaced out of its normal position, the position of the magnet 12 is changed relatively to the nozzles 15–20 and the throttling in the nozzles is changed thereby and is utilized for resetting the apparatus part to the normal position.

For the sake of simplicity only a part of the servo mechanism for the resetting to the normal position has been shown in FIG. 2. The nozzles 15 and 17 are in connection with the pressure gas intakes 25 and 27 and the cylinder 29–30 which is provided for displacement of the position of the apparatus part in x-direction by means of the shaft 28. If, for instance, the magnet 12 is displaced to the left, the nozzle 15 is throttled, and thereby the pressure in the part 29 is increased and the shaft 28 is reset and consequently the apparatus part is displaced to the right.

In the corresponding manner a servo mechanism is arranged for resetting in y-direction by means of the throttling in the nozzles 16 and 18. For displacements in z-direction the servo mechanism can be arranged as is schematically shown in FIG. 3. If the distance between the magnets 11 and 12 is changed the force of attraction will be changed. The throttling in the nozzles 19 and 20 will then be changed and the corresponding change of pressure is utilized as previously described in order to reset the distance.

FIG. 4 shows the fundamental construction of the system. For the sake of simplicity only the servo mechanism for one direction is shown. On two beams 41 and 42 which are arranged on both sides of and perpendicularly to a paper web 43, the carriages 44 and 45 are running. These carriages are driven in parallel by chains 51–52 which run over guide rollers 46. On the carriage 44 one resonator half 47 and the magnet 11 are placed. On the carriage 45 an air cylinder 29–30 is positioned. A slide 48 which can glide on the carriage 45 is connected to a bar 28 from the cylinder 29–30. Slide 48 carries the second resonator half 49, the nozzles 15, 17 and the suspension device 13 for the movable magnet 12. If the two chains 51–52, for instance, have a somewhat different length, the carriages 44 and 45 will under the operation of the traversion not entirely run together. Thereby the magnet 12 is influenced which by the pneumatic servo system displaces the slide 48 so that said slide and the carriage 44 run together all the time.

In order to increase the reliability and response of the device one can damp mechanical oscillations of magnet 12 by surrounding it with a good electrical conductor 12A as shown in FIG. 5. In addition, ambient magnetic disturbances can be minimized by surrounding magnet 12 with magnetically soft material 12B as shown in FIG. 6.

I claim:

1. A device for the accurate positioning to a given alignment of two mutually displaceable members comprising a first magnet means fixedly connected to one of the members in such a way that the magnetic axis of said first magnet means is rigidly defined, a second magnet means having a magnetic axis which is rigidly defined in such a way that when the members have the given alignment the magnetic axes of said magnet means are colinear, spring means connected to the other member and to said second magnet means in such a way that said spring means is in a plane perpendicular to the magnetic axis of said second magnet means and said second magnet means can pivot about a point defined by the magnetic axis of said second magnet means and said plane, and servo means responsive to the pivoting of said second magnet means resulting from a non-colinearity of said magnetic axes for moving at least one of the members until said magnetic axes are colinear.

2. The device according to claim 1 further comprising electrically conductive means surrounding portions of said second magnet means for electrodynamically damping mechanical oscillations of said second magnet means.

3. The device according to claim 1 further comprising magnetic shielding means surrounding portions of said second magnet means for reducing the effect of ambient magnetic disturbances.

4. A device according to claim 1 wherein said servo means comprises a plurality of pressure nozzles placed near one end of said second magnet means and oriented perpendicularly to the magnetic axis thereof when the members have said given alignment, a further pressure nozzle near said one end and oriented colinear with the magnetic axis of said second magnet means when said members have said given alignment so that a change in the position of said second magnet means causes a change of the throttling in said nozzles, and means for converting pressure alterations in said nozzles to mechanical forces for displacing the other member.

* * * * *